United States Patent
Zhang et al.

(10) Patent No.: US 10,613,842 B2
(45) Date of Patent: Apr. 7, 2020

(54) SIMPLIFYING A CONTROL FLOW GRAPH BASED ON PROFILING DATA

(71) Applicant: INTERNATIONAL BUSINESS MACHINES CORPORATION, Armonk, NY (US)

(72) Inventors: Bao Zhang, Beijing (CN); Naijie Li, Beijing (CN); Ming Ran Liu, Beijing (CN); Yuan Zhai, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/966,229

(22) Filed: Apr. 30, 2018

(65) Prior Publication Data

US 2019/0332364 A1 Oct. 31, 2019

(51) Int. Cl.
*G06F 8/41* (2018.01)
*G06F 8/77* (2018.01)

(52) U.S. Cl.
CPC .............. *G06F 8/433* (2013.01); *G06F 8/77* (2013.01)

(58) Field of Classification Search
CPC ..... G06F 8/20; G06F 8/22; G06F 8/24; G06F 8/35; G06F 8/40; G06F 8/41; G06F 8/43; G06F 8/433; G06F 8/443; G06F 8/77
USPC ........................................ 717/101, 136–161
See application file for complete search history.

(56) References Cited

U.S. PATENT DOCUMENTS

| 5,742,803 | A | * | 4/1998 | Igarashi | G06F 8/433 712/233 |
| 5,978,588 | A | * | 11/1999 | Wallace | G06F 8/445 717/156 |
| 5,999,736 | A | * | 12/1999 | Gupta | G06F 8/445 717/158 |
| 6,038,538 | A | * | 3/2000 | Agrawal | G06Q 10/063 705/7.11 |

(Continued)

FOREIGN PATENT DOCUMENTS

EP 0533813 B1 3/1998
EP 2141587 A1 1/2010

OTHER PUBLICATIONS

N. Bellas, I. N. Hajj, C. D. Polychronopoulos and G. Stamoulis, "Architectural and compiler techniques for energy reduction in high-performance microprocessors," in IEEE Transactions on Very Large Scale Integration (VLSI) Systems, vol. 8, No. 3, pp. 317-326, Jun. 2000. (Year: 2000).*

(Continued)

*Primary Examiner* — Andrew M. Lyons
(74) *Attorney, Agent, or Firm* — Cantor Colburn LLP; Noah Sharkan

(57) ABSTRACT

A computer-implemented method includes receiving an initial control flow graph (CFG) describing a project, where the project includes one or more programs. The initial CFG includes a plurality of graph nodes and a plurality of edges connecting the plurality of graph nodes to one another. Based on first profiling data, a first set of one or more graph nodes of the plurality of graph nodes of the initial CFG is selected as a first set of main nodes. The first profiling data describes a first execution history of the project. The initial CFG is simplified by generating a first final CFG, which includes the first set of main nodes and excludes one or more (Continued)

remaining nodes of the initial CFG that are not in the first set of main nodes.

20 Claims, 8 Drawing Sheets

(56) References Cited

U.S. PATENT DOCUMENTS

| | | | | |
|---|---|---|---|---|
| 6,072,951 | A * | 6/2000 | Donovan | G06F 8/4443 717/158 |
| 6,381,739 | B1 * | 4/2002 | Breternitz, Jr. | G06F 8/443 714/37 |
| 6,427,234 | B1 * | 7/2002 | Chambers | G06F 9/45516 717/140 |
| 6,934,935 | B1 * | 8/2005 | Bennett | G06F 11/323 714/E11.181 |
| 6,996,806 | B2 * | 2/2006 | Bates | G06F 11/3664 714/E11.207 |
| 7,624,382 | B2 * | 11/2009 | Chauvel | G06F 9/30174 717/132 |
| 7,634,765 | B2 * | 12/2009 | Ghiya | G06F 8/433 717/140 |
| 7,831,526 | B1 * | 11/2010 | Crawford | G06F 16/904 706/11 |
| 7,912,964 | B2 | 3/2011 | Sabatelli et al. | |
| 7,945,668 | B1 * | 5/2011 | Nucci | G06K 9/622 709/225 |
| 8,079,020 | B2 | 12/2011 | Chilimbi et al. | |
| 8,117,606 | B2 * | 2/2012 | Chakrabarti | G06F 8/433 717/152 |
| 8,316,345 | B2 * | 11/2012 | Gulwani | G06F 8/433 717/104 |
| 8,543,648 | B1 * | 9/2013 | Rhodes | G06F 16/9027 709/205 |
| 8,645,924 | B2 * | 2/2014 | Li | G06F 8/443 717/124 |
| 8,762,960 | B2 * | 6/2014 | Baca | G06F 11/3636 717/124 |
| 8,762,970 | B2 * | 6/2014 | Kawahito | G06F 8/40 717/104 |
| 8,826,255 | B1 * | 9/2014 | Avadhanula | G06F 8/433 717/154 |
| 9,009,681 | B2 * | 4/2015 | Schmidt | G06F 8/443 717/130 |
| 9,250,880 | B2 * | 2/2016 | Nakaike | G06F 8/433 |
| 9,298,858 | B1 * | 3/2016 | Tomar | G06F 11/366 |
| 9,727,734 | B2 * | 8/2017 | Tripp | G06F 21/577 |
| 2003/0005419 | A1 * | 1/2003 | Pieper | G06F 8/4442 717/141 |
| 2003/0061600 | A1 * | 3/2003 | Bates | G06F 11/3664 717/133 |
| 2003/0097652 | A1 * | 5/2003 | Roediger | G06F 8/443 717/160 |
| 2003/0204840 | A1 * | 10/2003 | Wu | G06F 11/3612 717/158 |
| 2003/0226133 | A1 * | 12/2003 | Grover | G06F 8/443 717/140 |
| 2004/0199904 | A1 * | 10/2004 | Schmidt | G06F 8/443 717/130 |
| 2005/0044538 | A1 * | 2/2005 | Mantripragada | G06F 8/443 717/151 |
| 2006/0047681 | A1 * | 3/2006 | Ghiya | G06F 8/433 |
| 2006/0048114 | A1 * | 3/2006 | Schmidt | G06F 9/45516 717/148 |
| 2008/0196012 | A1 | 8/2008 | Cohen et al. | |
| 2009/0172654 | A1 * | 7/2009 | Zhao | G06F 9/45516 717/158 |
| 2009/0307656 | A1 * | 12/2009 | Eichenberger | G06F 8/45 717/110 |
| 2009/0315890 | A1 * | 12/2009 | Modani | G06Q 10/10 345/440 |
| 2010/0153923 | A1 * | 6/2010 | Kawahito | G06F 8/70 717/124 |
| 2010/0211924 | A1 * | 8/2010 | Begel | G06F 8/74 717/101 |
| 2010/0251210 | A1 * | 9/2010 | Amaral | G06F 11/3604 717/105 |
| 2010/0274972 | A1 * | 10/2010 | Babayan | G06F 9/3842 711/125 |
| 2012/0197854 | A1 * | 8/2012 | Amaral | G06F 11/3604 707/705 |
| 2012/0331064 | A1 * | 12/2012 | Deeter | G06Q 50/01 709/206 |
| 2014/0074893 | A1 * | 3/2014 | Griffin | H04L 67/22 707/798 |
| 2014/0101643 | A1 * | 4/2014 | Inoue | G06F 8/4441 717/156 |
| 2014/0310813 | A1 * | 10/2014 | Murthy | G06F 21/57 726/25 |
| 2014/0351289 | A1 * | 11/2014 | Bekas | G06F 9/3001 707/798 |
| 2015/0067553 | A1 * | 3/2015 | Grieve | G06F 3/0484 715/765 |
| 2015/0074651 | A1 * | 3/2015 | Chockler | G06F 11/3616 717/126 |
| 2016/0070550 | A1 * | 3/2016 | Van Eijndhoven | G06F 8/456 717/156 |
| 2016/0170725 | A1 * | 6/2016 | Holton | G06F 8/433 717/157 |
| 2016/0188713 | A1 * | 6/2016 | Green | G06F 16/38 707/738 |
| 2016/0378550 | A1 * | 12/2016 | Bertran Monfort | G06F 9/4887 718/102 |
| 2017/0017747 | A1 * | 1/2017 | Cho | G06F 17/5045 |
| 2017/0090919 | A1 | 3/2017 | Shi et al. | |
| 2018/0024820 | A1 * | 1/2018 | Davis | G06F 8/443 717/155 |
| 2018/0181676 | A1 * | 6/2018 | Khandelwal | G06F 16/13 |
| 2019/0196939 | A1 * | 6/2019 | Lengauer | G06F 9/5016 |

OTHER PUBLICATIONS

Lee B., Resnick K., Bond M.D., McKinley K.S. (2007) Correcting the Dynamic Call Graph Using Control-Flow Constraints. In: Krishnamurthi S., Odersky M. (eds) Compiler Construction. CC 2007. Lecture Notes in Computer Science, vol. 4420. (Year: 2007).*

T. Ball and J. R. Larus, "Efficient path profiling," in Proceedings of MICRO-29, pp. 46-57, Dec. 1996. (Year: 1996).*

P. Berube and J. N. Amaral, "Combined profiling: A methodology to capture varied program behavior across multiple inputs," 2012 IEEE International Symposium on Performance Analysis of Systems & Software, New Brunswick, NJ, 2012, pp. 210-220. (Year: 2012).*

Kapil Vaswani, Aditya V. Nori, and Trishul M. Chilimbi. 2007. Preferential path profiling: compactly numbering interesting paths. In Proceedings of the 34th annual ACM SIGPLAN-SIGACT symposium on Principles of programming languages (POPL '07). ACM, New York, NY, USA, 351-362. (Year: 2007).*

C. Young and M. D. Smith, "Better global scheduling using path profiles," Proceedings. 31st Annual ACM/IEEE International Symposium on Microarchitecture, Dallas, TX, USA, 1998, pp. 115-123. (Year: 1998).*

Gulwani et al., "Control-flow Refinement and Progress Invariants for Bound Analysis," PLDI'09, Jun. 15-20, 2009, pp. 1-11.

* cited by examiner

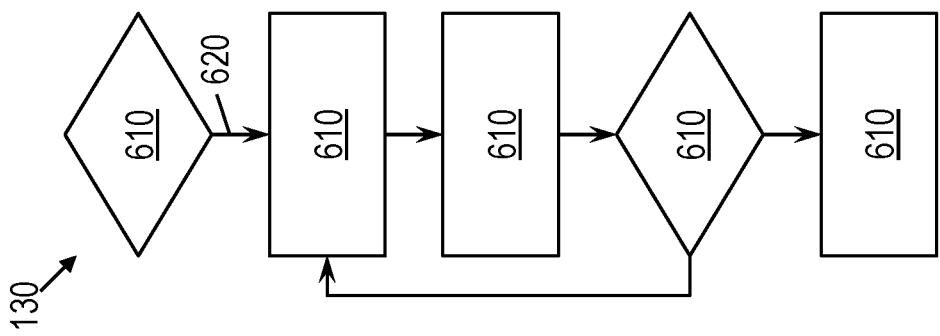
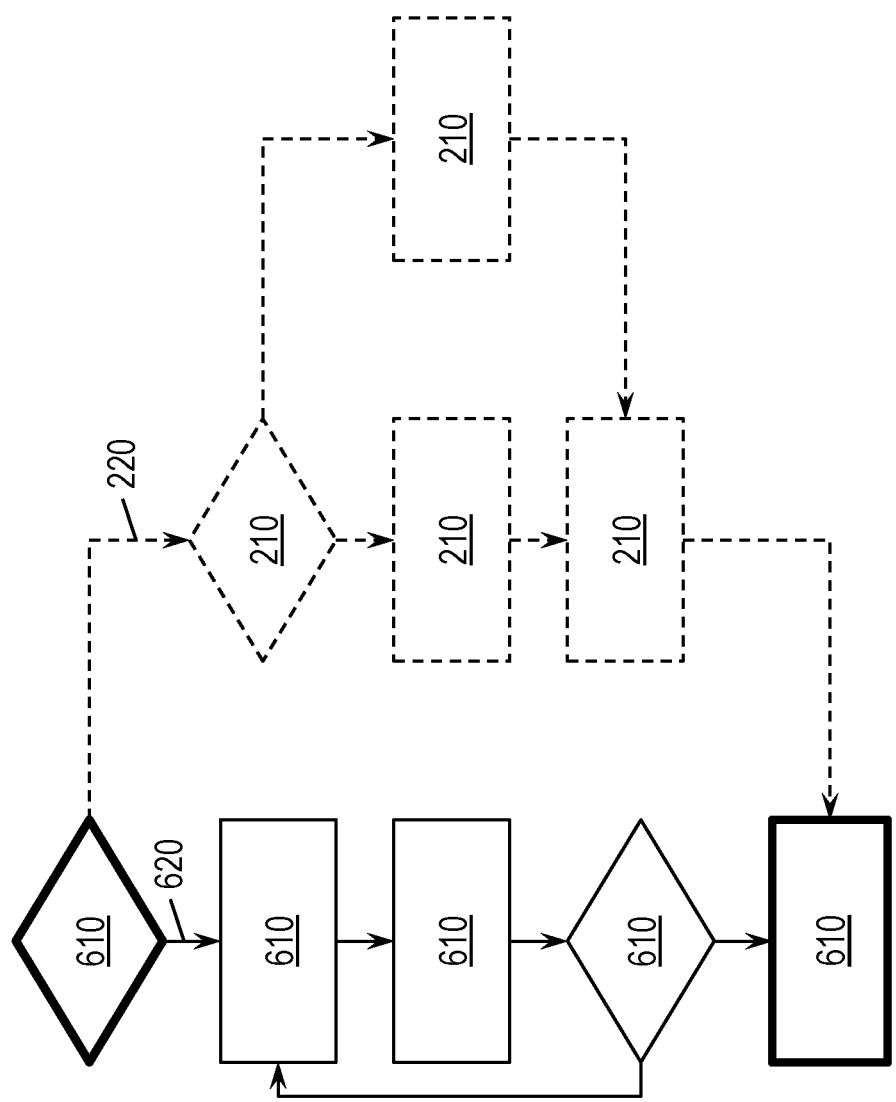
FIG. 6B
FIG. 6A

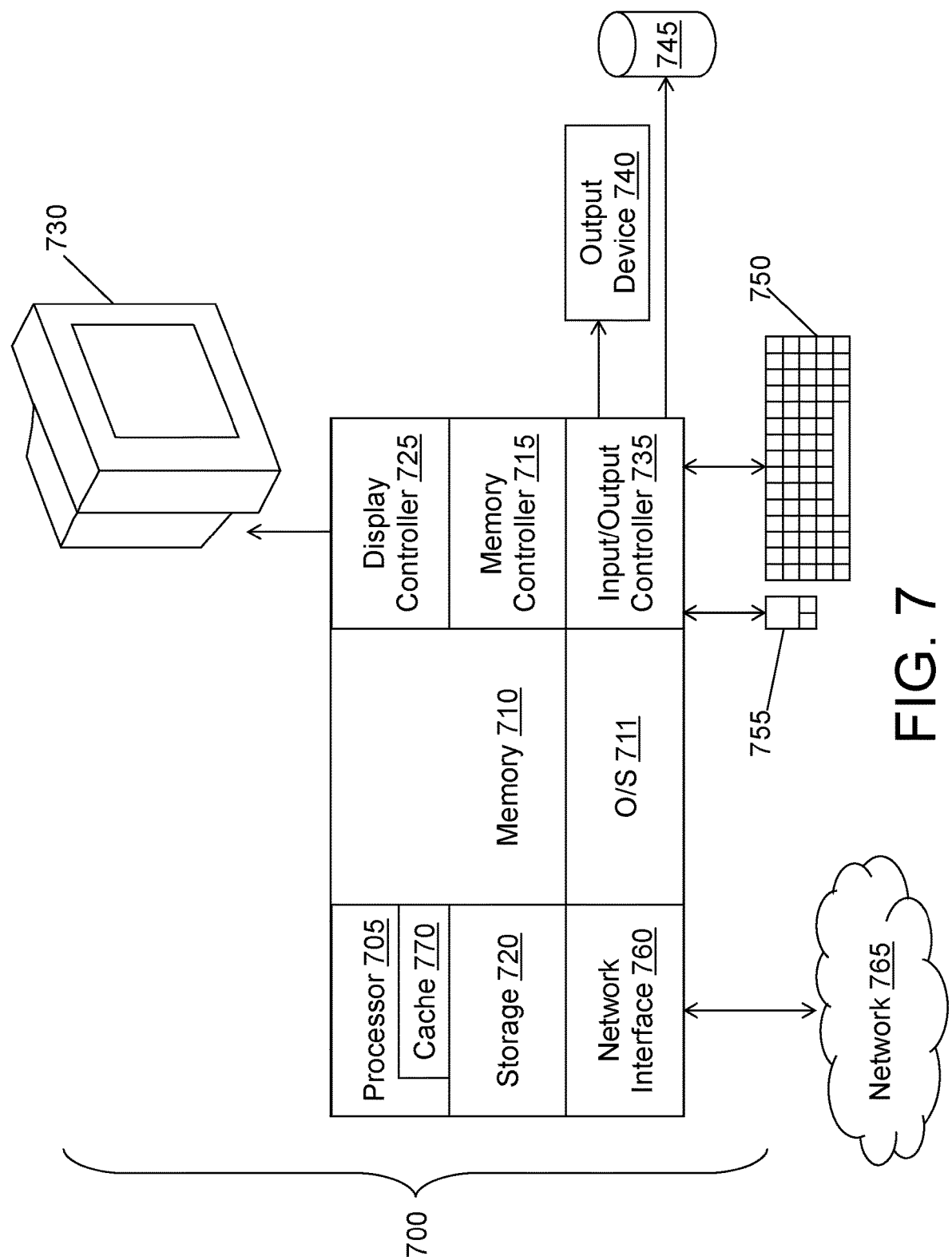

SIMPLIFYING A CONTROL FLOW GRAPH BASED ON PROFILING DATA

BACKGROUND

The present invention relates to control flow graphs and, more specifically, to simplifying a control flow graph based on profiling data.

A control flow graph (CFG) is a representation in graph notation of paths that could be traversed through a project, which can include one or more programs, during execution. In other words, a CFG shows the control flow of a project. Conventionally, a CFG shows all possible paths.

A CFG generally includes a set of graph nodes and a set of directed edges connecting those graph nodes. Each graph node of the CFG represents a node of a program in the project, also referred to as a program node, a statement, or a basic block. A program node is a portion of code within the project with only one entry point and only one exit point. Each edge of the CFG starts at a respective first graph node representing a first program node and terminates at a respective second graph node representing a second program node. Such an edge indicates that execution can flow directly from the first program node to the second program node, without passing through any other program nodes.

CFGs help users understand the design of large projects. From a programmer's perspective, a CFG can help the programmer determine how to approach revisions. For a marketing team, a CFG can help describe the project. For an end user, a CFG can describe a project's capabilities and how to use those capabilities.

SUMMARY

Embodiments of the present invention are directed to a computer-implemented method for simplifying a control flow graph. A non-limiting example of the computer-implemented method includes receiving an initial CFG describing a project, where the project includes one or more programs. The initial CFG includes a plurality of graph nodes and a plurality of edges connecting the plurality of graph nodes to one another. Based on first profiling data, a first set of one or more graph nodes of the plurality of graph nodes of the initial CFG is selected as a first set of main nodes. The first profiling data describes a first execution history of the project. The initial CFG is simplified by generating a first final CFG, which includes the first set of main nodes and excludes one or more remaining nodes of the initial CFG that are not in the first set of main nodes.

Embodiments of the present invention are directed to a system for simplifying a control flow graph. A non-limiting example of the system includes a memory having computer-readable instructions and one or more processors for executing the computer-readable instructions. The computer-readable instructions include receiving an initial CFG describing a project, where the project includes one or more programs. The initial CFG includes a plurality of graph nodes and a plurality of edges connecting the plurality of graph nodes to one another. Further according to the computer-readable instructions, based on first profiling data, a first set of one or more graph nodes of the plurality of graph nodes of the initial CFG is selected as a first set of main nodes. The first profiling data describes a first execution history of the project. The initial CFG is simplified by generating a first final CFG, which includes the first set of main nodes and excludes one or more remaining nodes of the initial CFG that are not in the first set of main nodes.

Embodiments of the invention are directed to a computer-program product for simplifying a control flow graph, the computer-program product including a computer-readable storage medium having program instructions embodied therewith. The program instructions are executable by a processor to cause the processor to perform a method. A non-limiting example of the method includes receiving an initial CFG describing a project, where the project includes one or more programs. The initial CFG includes a plurality of graph nodes and a plurality of edges connecting the plurality of graph nodes to one another. Further according to the method, based on first profiling data, a first set of one or more graph nodes of the plurality of graph nodes of the initial CFG is selected as a first set of main nodes. The first profiling data describes a first execution history of the project. The initial CFG is simplified by generating a first final CFG, which includes the first set of main nodes and excludes one or more remaining nodes of the initial CFG that are not in the first set of main nodes.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 6A-6B illustrate an example of executing the method of selecting main nodes and main edges, according to some embodiments of the invention; and FIG. 7 is a block diagram of a computer system for implementing some or all aspects of the simplification system, according to some embodiments of this invention.

Figure 1:
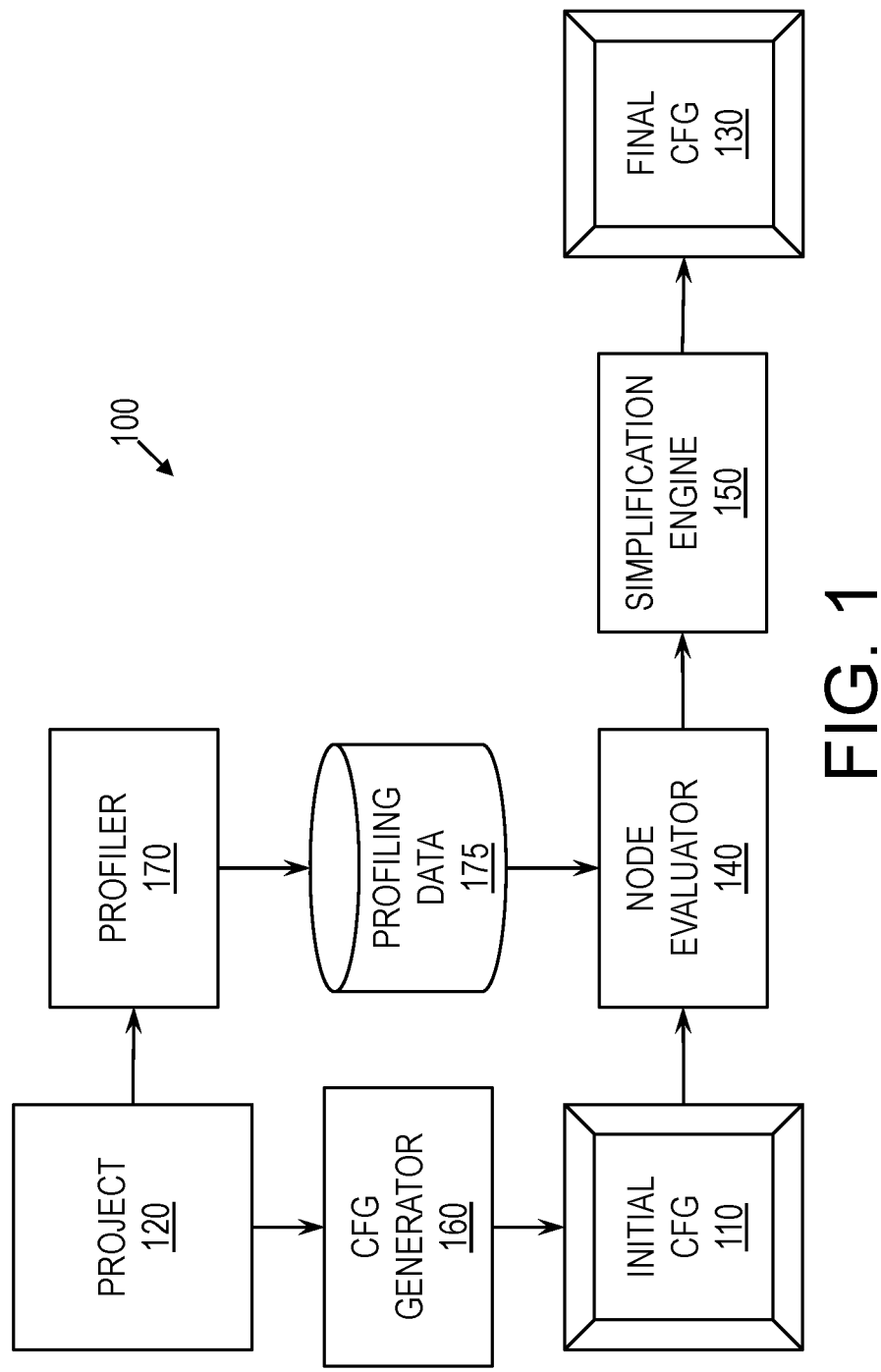
FIG. 1 is a block diagram of a simplification system for simplifying a CFG, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in practice, CFGs are often too large or too complex to be as useful as desired. Due to this complexity, users are often unable to use CFGs to understand the logic of a coding project with a long history, to understand the relationship between new changes and currently existing code, or to perform error diagnostics given the numerous possible paths shown through the directed edges of the CFG. As a result, the complexity of CFGs can lead to considerable cost in development, debugging, and maintenance of a project.

Turning now to an overview of the aspects of the invention, one or more embodiments of the invention address the above-described shortcomings of the prior art by providing a mechanism to simplify CFGs, thus making them more useable and more cost-effective to use. More specifically, some embodiments of the invention calculate an execution probability and a weight of each program node. Main nodes are selected in an initial CFG based on the weights or probabilities, and additional main nodes are selected along the routes between those main nodes. Main edges are selected between the various main nodes. To generate a final CFG, which is simplified from the initial CFG, these main nodes and edges are included in the final CFG while all other graph nodes and edges may be excluded.

The above-described aspects of the invention address the shortcomings of the prior art by reducing the complexity of CFGs. This invention provides a way to refine the initial CFG into a simplified version that shows relevant paths and excludes interfering paths. As a result, a user can quickly understand the actual uses of a large project represented by the CFG. This can facilitate project maintenance, especially for legacy projects and large software packages. This can also help maintainers identify and isolate root causes of faults by trimming off irrelevant paths and highlighting main paths. In summary, embodiments of the invention are improved methods of generating CFGs.

Turning now to a more detailed description of aspects of the present invention, FIG. 1 is a block diagram of a simplification system 100, according to some embodiments of this invention. As discussed above, the simplification system 100 may simplify an initial CFG 110, thus increasing usability. As shown in FIG. 1, the simplification system 100 may take an initial CFG 110 representing a project 120, which may include one or more programs. From the initial CFG 110, the simplification system 100 may generate a final CFG 130 representing the project 120.

Figure 2:
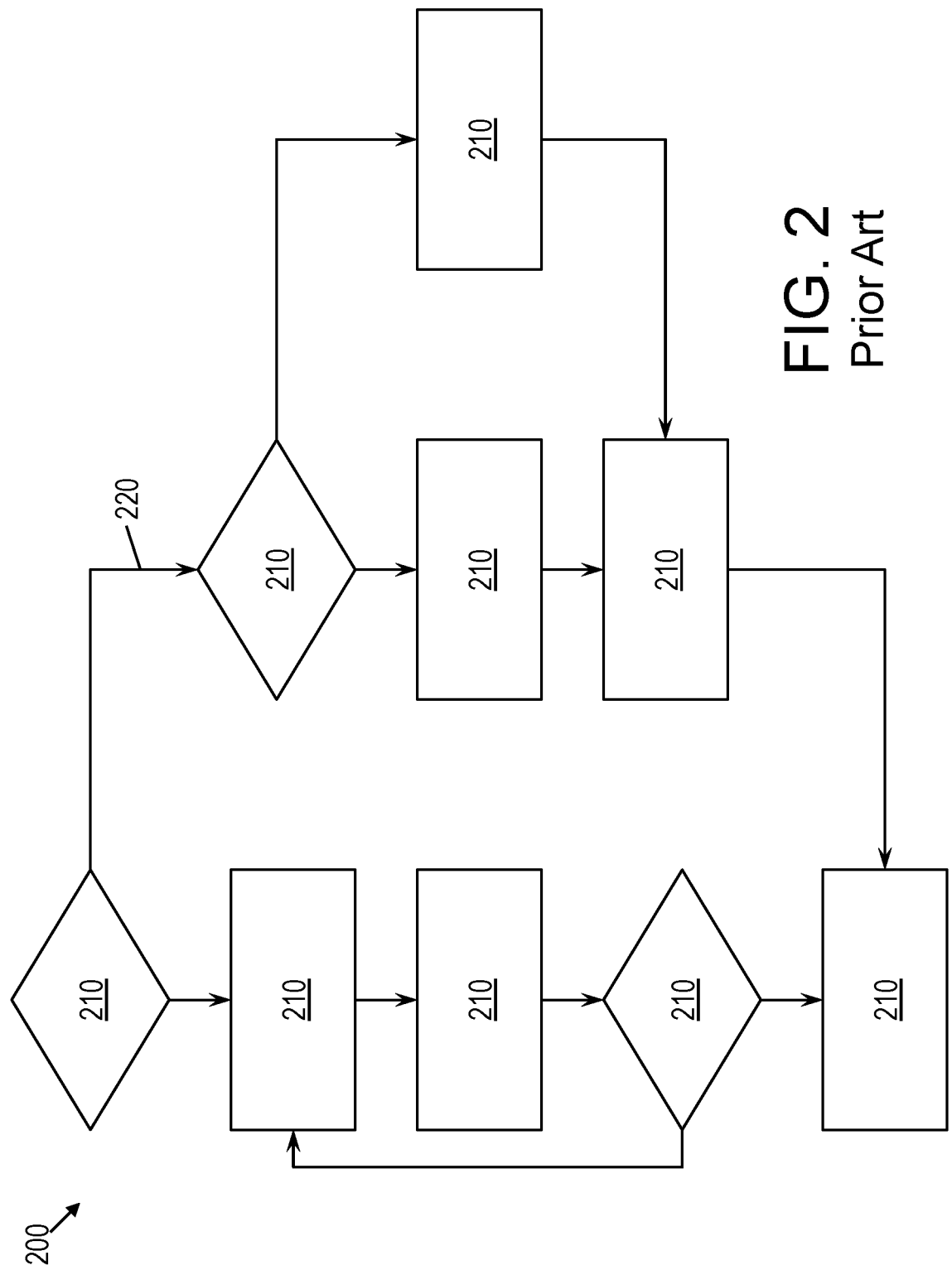
FIG. 2 is an example CFG.

An example CFG 200 is shown in FIG. 2. As mentioned above, a CFG 200, such as both the initial CFG 110 and the final CFG 130, includes a plurality of graph nodes 210, each representing a corresponding program node. A plurality of edges 220 indicate the control flow of the project 120 represented by the CFG 200. However, while this example includes only nine graph nodes 210, a CFG 200 may include hundreds or thousands of graph nodes 210. The CFG 200 may be too complex to be conveniently understood by human users. For a user to understand a complex CFG 200, he or she would need to zoom in to see details of edges 220 connecting individual graph nodes 210. However, at a magnified level, the larger picture of the full CFG 200 would be lost and may not be understood.

As shown in FIG. 1, to simplify the initial CFG 110, the simplification system 100 may include a node evaluator 140 and a simplification engine 150. Generally, the node evaluator 140 may evaluate graph nodes 210 of the initial CFG 110 in preparation for simplification, and the simplification engine 150 may simplify the initial CFG 110 based at least in part on the node evaluation. The simplification system 100 may further include or may receive input from, a CFG generator 160. The CFG generator 160 may generate the initial CFG 110. Various CFG generators are known in the art and usable as the CFG generator 160.

In some embodiments of the invention, the simplification system 100 further includes, or receives input from, a profiler 170. The profiler 170 may collect profiling data 175 describing actual executions of the project 120. Generally, in software engineering, profiling is a form of dynamic program analysis that measures, for example, the space or time complexity of a program, the usage of instructions, or the frequency and duration of function calls. Most commonly, profiling information serves to aid program optimization. Profiling is achieved by instrumenting either program source code or its binary executable form using a tool called a profiler. Conventionally, profilers may use several different techniques, such as event-based, statistical, instrumented, and simulation methods. For the simplification system 100, the profiler 170 may utilize conventional profiling techniques that are known in the art.

In some embodiments of the invention, the profiler 170 is in communication with one or more computing devices capable of running the project 120. For example, and not by way of limitation, the profiler 170 may be or may include a software agent that runs in the background. Each time the project 120 is run on the one or more computing devices, the profiler 170 may track the execution of the project 120. As a result, the profiler 170 may build the profiling data 175 to describe those executions. Specifically, the profiling data 175 may describe the execution path (i.e., the route through the various program nodes) of each execution of the project 120.

The simplification system 100 may exploit the profiling data 175 to simplify and thereby refine the initial CFG 110. In some embodiments of the invention, the profiling data 175 is dynamic data that is generated through actual use of the project 120. Thus, the profiling data 175 may vary for each instance of the project 120. For example, and not by way of limitation, a first computing device may have first profiling data 175, while a second computing device may have second profiling data 175 that is distinct from the first profiling data 175, because each set of profiling data 175 describes actual executions of the respective users. Because the initial CFG 110 may illustrate all possible execution paths, the initial CFG 110 does not limit itself or focus on execution paths that are most often used and thus most likely to be used. In contrast, the result of simplifying the initial CFG 110 may vary depending on the profiling data 175. This can be viewed as a benefit of the invention, as the resulting final CFG 130 is based on usage of the program that is relevant to those who will be using the final CFG 130.

Each of the profiler 170, the node evaluator 140, the simplification engine 150, and the CFG generator 160 may include hardware, software, or a combination of both. For instance, each of these components may be a software function or a specialized hardware circuit.

Figure 3:
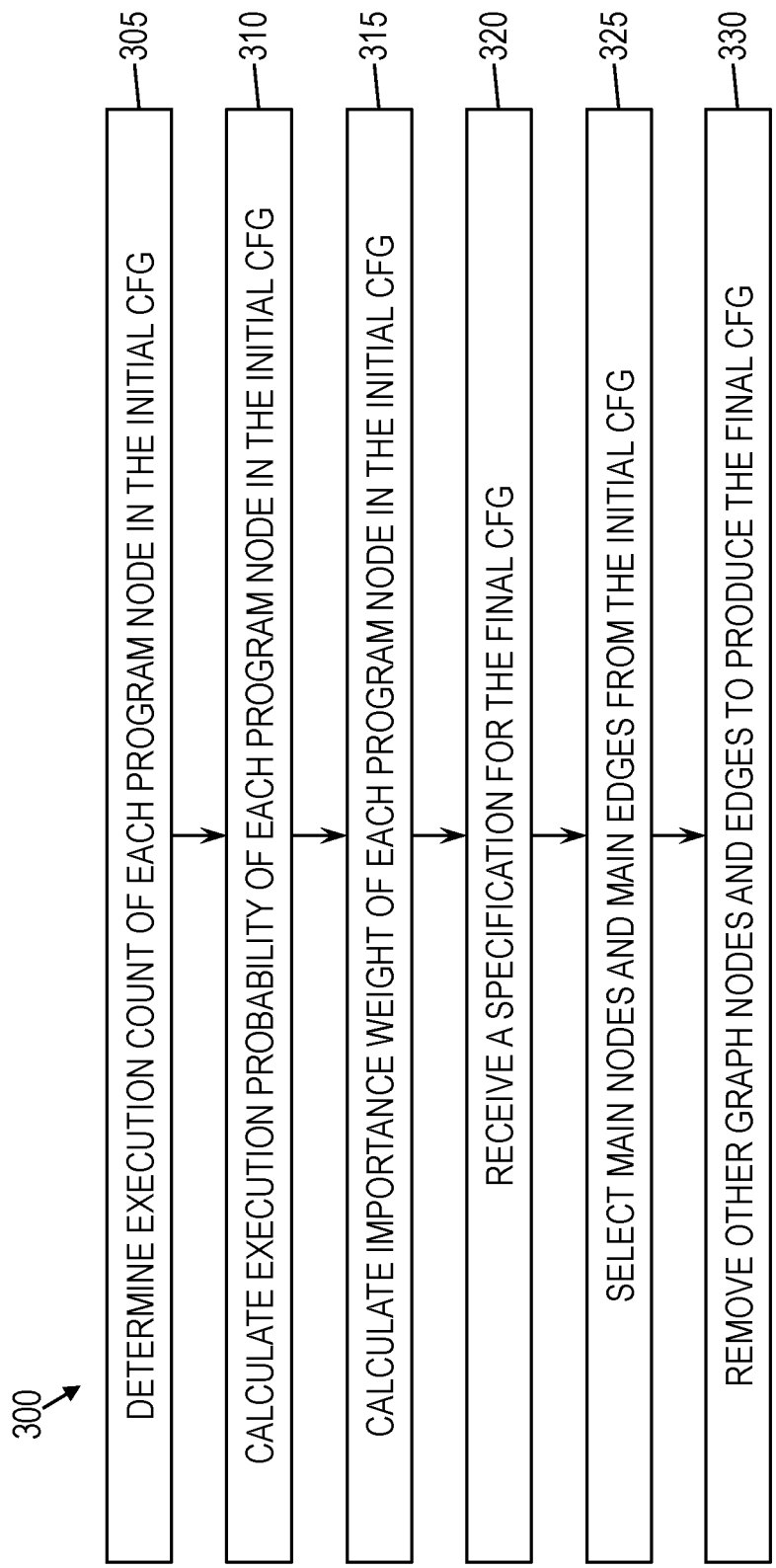
FIG. 3 is a flow diagram of a method of simplifying a CFG, according to some embodiments of the invention.

FIG. 3 is a flow diagram of a method 300 for simplifying an initial CFG 110 to produce a final CFG 130, according to some embodiments of this invention. In blocks 305-315 of the method 300, the simplification system 100 may evaluate the various program nodes and, thus, the corresponding graph nodes 210. In some embodiments of the invention, there is a one-to-one correspondence between program nodes and graph nodes 210 of the initial CFG 110, and thus evaluating a program node may be deemed equivalent to evaluating the corresponding graph node 210.

As shown in FIG. 3, at block 305, the simplification system 100 may determine the number of times each program node in the project 120 was executed. This value is referred to herein as the execution count. The execution count may be determined based on the profiling data 175. For example, in some embodiments of the invention, the profiling data 175 includes a count c(i, j) for each program node and each execution of the project 120, where c(i, j) is the number of times the $j^{th}$ program node, node(j), was executed in the $i^{th}$ execution, execution(i), of the project 120. It will be understood that i is in the range of [1, T], where T is the total count of executions represented in the profiling data 175, and j is in the range [1, N], where N is the total number of program nodes, which is equivalent to the number of graph nodes in some embodiments of this invention. In that case, the total number of times a node(j) was executed may be calculated as the sum of c(i, j) for all i, or all executions.

At block 310, the simplification system 100 may calculate the probability that each program node would be executed in a randomly selected execution. This value is referred to herein as the execution probability. Specifically, for instance, the probability that node(j) will be executed is $$p(j) = \sum \frac{E(i, j)}{T},$$

where T is the total number of executions in the profiling data 175, and E(i, j) is a Boolean value describing whether node(j) was executed during execution(i). For instance, E(i, j) is 1 if node(j) was executed in execution(i), and E(i, j) is 0 if node(j) was not executed in execution(i).

At block 315, the simplification system 100 may calculate an importance weight of each program node. In some embodiments of the invention, the probability p(j) may be used as a basis for the importance of a program node. If p(j) is high, then node(j) is regularly executed and may thus be deemed important to the execution of the project 120 in general. More specifically, in some embodiments of the invention, the importance weight, or simply the weight, of node(j) may be calculated as w(j)=α·Nc(j)+β·p(j), where α and β are scalars and Nc(j) is the normalized execution count of node(j). In some embodiments of the invention, the normalized execution count of node(j) is calculated by dividing the execution count c(j) by the maximum of the execution counts of all the program nodes.

The scalars α and β may be in the range of [0, 1] and may be adjusted to tweak the resulting simplified CFGs. In some embodiments of the invention, α+β=1, but that need not be the case. If the project 120 has one or more loops that are executed a large number of times, then α may be set smaller while β is larger, thereby reducing the impact of numerous executions of a program node per execution.

At block 320, a specification for the final CFG 130 may be received. For example, and not by way of limitation, this specification may indicate a minimum count of graph nodes 210 to be included in the final CFG 130 or a probability threshold desired for graph nodes 210 in the final CFG 130. In some embodiments of the invention, however, no such specification is required, and the simplification system 100 can operate with or without one.

At block 325, the simplification system 100 may select a plurality of main nodes and a plurality of main edges to be included in the final CFG 130. The main nodes may be a subset of graph nodes 210 from the initial CFG 110, and the main edges may be a subset of edges 220 from the initial CFG 110. In some embodiments of the invention, the main nodes and the main edges may exclude one or more graph nodes 210 and one or more edges 220 of the initial CFG 110. A method of selecting these main nodes and main edges is described in detail below, with reference to FIGS. 4A-4B. In some embodiments of the invention, the method of selecting the main nodes and main edges utilizes the specification received at block 320. Generally, the selection of main nodes may be based on probability, weight, or both. Main nodes may include both primitive main nodes and derived main nodes. Primitive main nodes may be selected for their high weight or high probability, while derived main nodes may be selected due to lying on important routes through the initial CFG 110. Main edges may connect main nodes together.

At block 330, remaining graph nodes 210 and edges 220 may be removed from the initial CFG 110 to produce the final CFG 130. In some embodiments of the invention, this removal occurs by directly modifying the initial CFG 110, as originally stored or as copied. Alternatively, however, the main edges and main nodes of the initial CFG 110 may be selectively copied, thus implicitly removing the remaining graph nodes 210 and edges 220, to result in the final CFG 130.

Figure 4A:
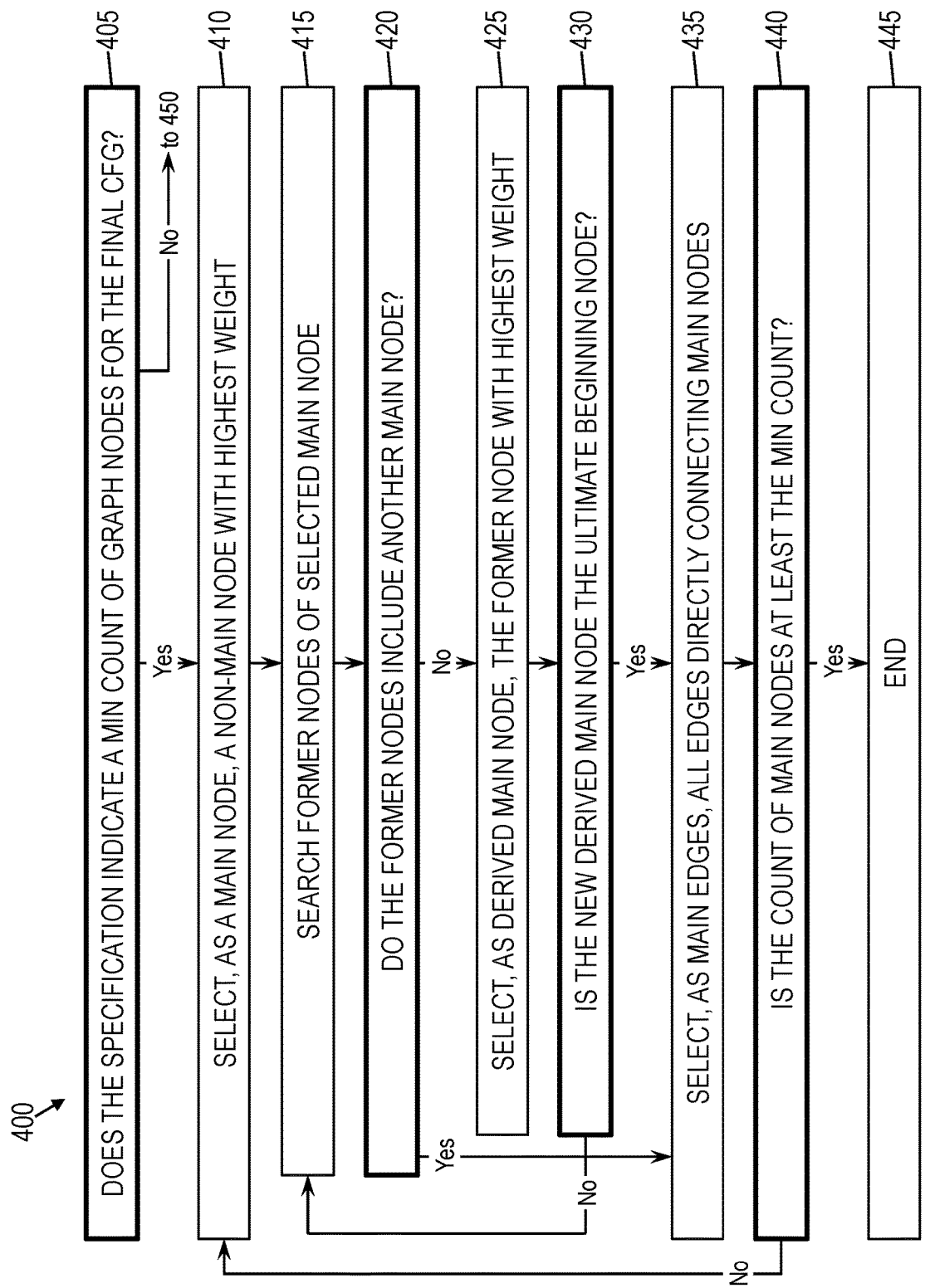
FIGS. 4A-4B together are a flow diagram of a method 400 of selecting main nodes and main edges to be included in a final CFG, according to some embodiments of the invention.
Figure 4B:
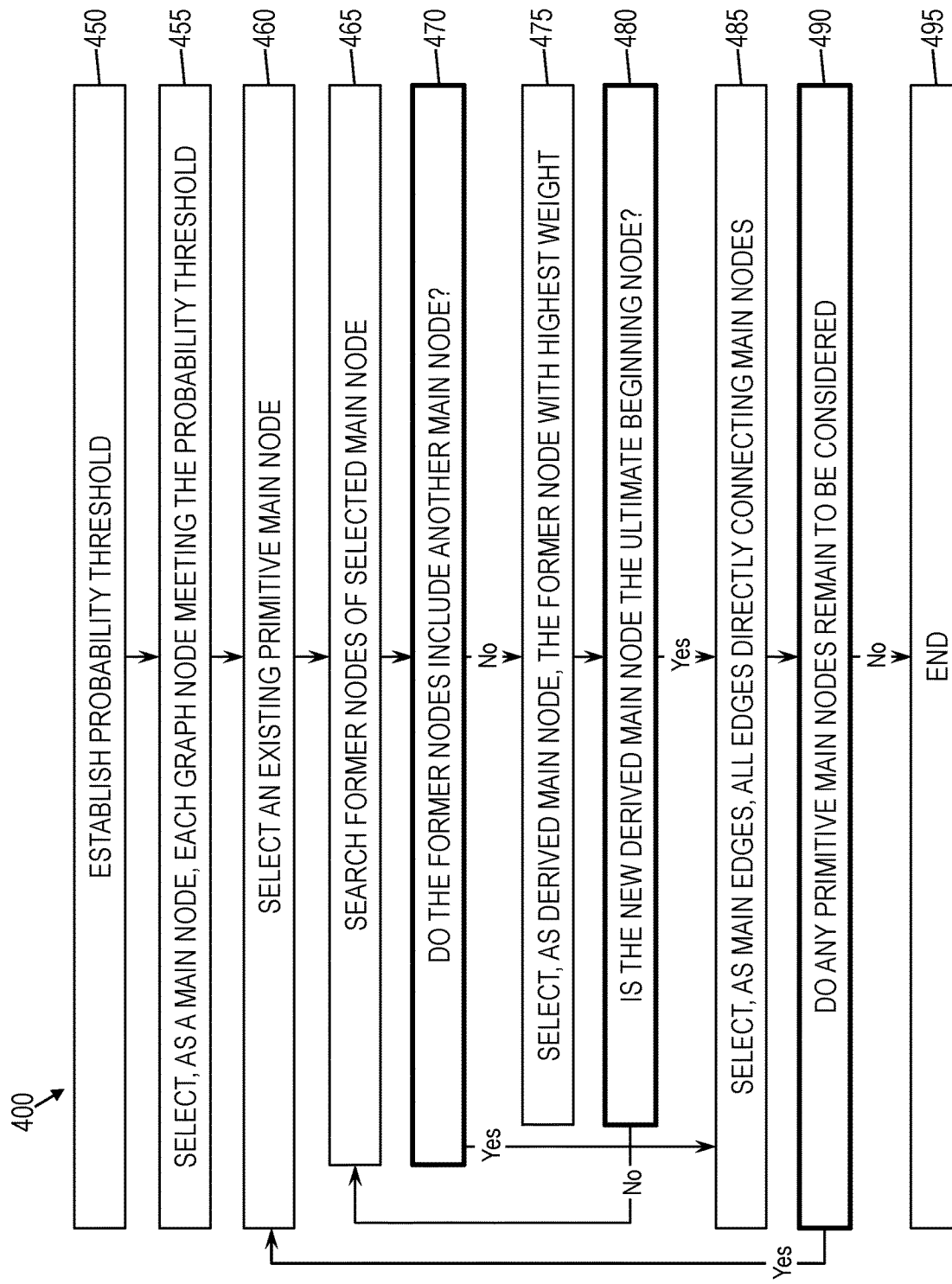

FIGS. 4A-4B together are a flow diagram of a method 400 of selecting main nodes and main edges for inclusion in the final CFG 130, according to some embodiments of the invention. In some embodiments of the invention, this method 400 is performed by the simplification engine 150. Before the method 400 begins, a specification may be received for the building of the final CFG 130. For example, this specification may be provided by a user who wishes to simplify the initial CFG 110. The specification may be, for example, a minimum count of graph nodes 210 to be included in the final CFG 130 or a probability threshold for graph nodes 210.

As shown in FIG. 4A, at decision block 405, it may be determined whether the specification indicates a minimum count of graph nodes 210 for the final CFG 130. If the minimum count is specified, then the method 400 may proceed to block 410. Otherwise, the method 400 may proceed to block 450 in FIG. 4B.

Block 410 may be the beginning of an iterative loop, where at least one main node may be specified in each iteration of the loop. Each time block 410 is reached, at least one graph node 210 of the initial CFG 110 has not yet been selected as a main node. At block 410, of the remaining non-main nodes of the graph nodes 210 in the initial CFG 110, the one with the highest weight may be selected as a main node, specifically a primitive main node. If multiple graph nodes 210 that are not yet main nodes are tied with highest weight, then various algorithms may be used to select one of those multiple graph nodes 210. For example, and not by way of limitation, a random selection may be made from among the graph nodes 210 with the tied highest weight. The newly selected main node is referred to as the selected main node.

At block 415, the former nodes of the selected main node may be searched for existing main nodes. In this disclosure, a former node of node(j) is a graph node 210 that jumps to node(j). Further, in this disclosure, a first graph node 210 "jumping to" a second graph node 210 refers to the ability of program execution to flow directly from the program node represented by the first graph node 210 to the program node represented by the second graph node 210 without having to pass through any intervening program node. In other words, the first and second graph nodes 210 have a directed edge 220 between them and are thus potentially adjacent. However, if node(j) is the beginning graph node 210 of a loop, the former nodes of node(j) include only graph nodes 210 that jump to node(j) from outside the loop. In other words, a graph node 210 that is at the end of a loop iteration and thus jumps back to the beginning, landing on node(j), would not be deemed a former node of node(j) according to some embodiments of the invention.

At decision block 420, based on the search of former nodes, it may be determined whether the former nodes of the selected main node include any other main nodes. If the main node is identified in the former nodes of the selected main node, then the method 400 may skip to block 435. Alternatively, if no such main node is found, then the method 400 may proceed to block 425.

At block 425, when no main node exists in the former nodes of the selected main node, the former node with the highest weight may be selected as a new main node. If multiple former nodes exist with the highest weight, then various mechanisms exist to select one of such former nodes. For example, a random selection may be made from among the former nodes with the highest weight. Specifically, this new main node may be a new derived main node.

At decision block 430, it may be determined whether the new derived main node is the ultimate beginning node (i.e., the node at which the entire initial CFG 110 begins). If the new derived main node is not the ultimate beginning node, then the method 400 may return to block 415, with the new derived main node now being the selected main node. However, if the new derived main node is the ultimate beginning node, then the method 400 may proceed to block 435.

At block 435, the various edges 220 that are not yet selected as main edges and that directly connect one main node to another main node in the initial CFG 110 may be selected as main edges. In other words, each directed edge 220 that starts at a main node, whether new or previously selected, and ends at another main node, whether new or previously selected, may now be deemed a main edge.

At decision block 440, it may be determined whether the total number of main nodes is at least the minimum count in the specification. If not, then the method 400 may return to block 410 to select an additional main node. However, if the minimum count has been met, then at block 445, the process of selecting main nodes and main edges may end.

However, as shown in FIG. 4B, if it was determined at decision block 405 that no count of main nodes was specified, then a probability threshold may be established at block 450. The specification received may indicate a probability threshold, and in such cases, establishing the probability threshold may require simply identifying that the probability threshold was received. Alternatively, for example, a default probability threshold may be used, or the median probability or other representative probability of the graph nodes 210 may be used as the probability threshold.

At block 455, each graph node 210 of the initial CFG 110 that has a probability that meets the probability threshold (i.e., is at least the probability threshold) may be selected as a main node. Specifically, these may be primitive main nodes.

In turn, each primitive main node may be selected and considered in an iterative loop. At block 460, a primitive main node that has not yet been selected may be selected for consideration below and thus deemed the selected main node.

At block 465, the former nodes of the selected main node may be searched for existing main nodes. At decision block 470, it may be determined based on the search whether the former nodes of the selected main node include any other main nodes. If a main node is identified in the former nodes of the selected main node, then the method 400 may skip to block 485. Alternatively, if no such main node is found, then the method 400 may proceed to block 475.

At block 475, when no main node exists in the former nodes of the selected main node, the former node with the highest weight may be selected as a new main node. If multiple former nodes exist with the highest weight, then various mechanisms exist to select one of such former nodes. For example, a random selection may be made from among the former nodes with the highest weight. Specifically, this new main node may be a new derived main node.

At decision block 480, it may be determined whether the new derived main node is the ultimate beginning node. If the new derived main node is not the ultimate beginning node, then the method 400 may return to block 465, with the new derived main node now being the selected main node. However, if the new derived main node is the ultimate beginning node, then the method 400 may proceed to block 485.

At block 485, the various edges 220 that are not yet selected as main edges and that directly connect one main node to another in the initial CFG 110 may be selected as main edges. In other words, each directed edge that starts at a main node, whether new or previously selected, and ends at another main node, whether new or previously selected, may now be deemed a main edge.

At decision block 490, it may be determined whether any primitive main nodes exist that have not yet been selected for an iteration of the loop. If so, then the method 400 may return to block 460 to select another primitive main node. If no primitive main nodes remain to be considered, then the method 400 may proceed to block 495. At block 495, the method 400 concludes.

Figure 5:
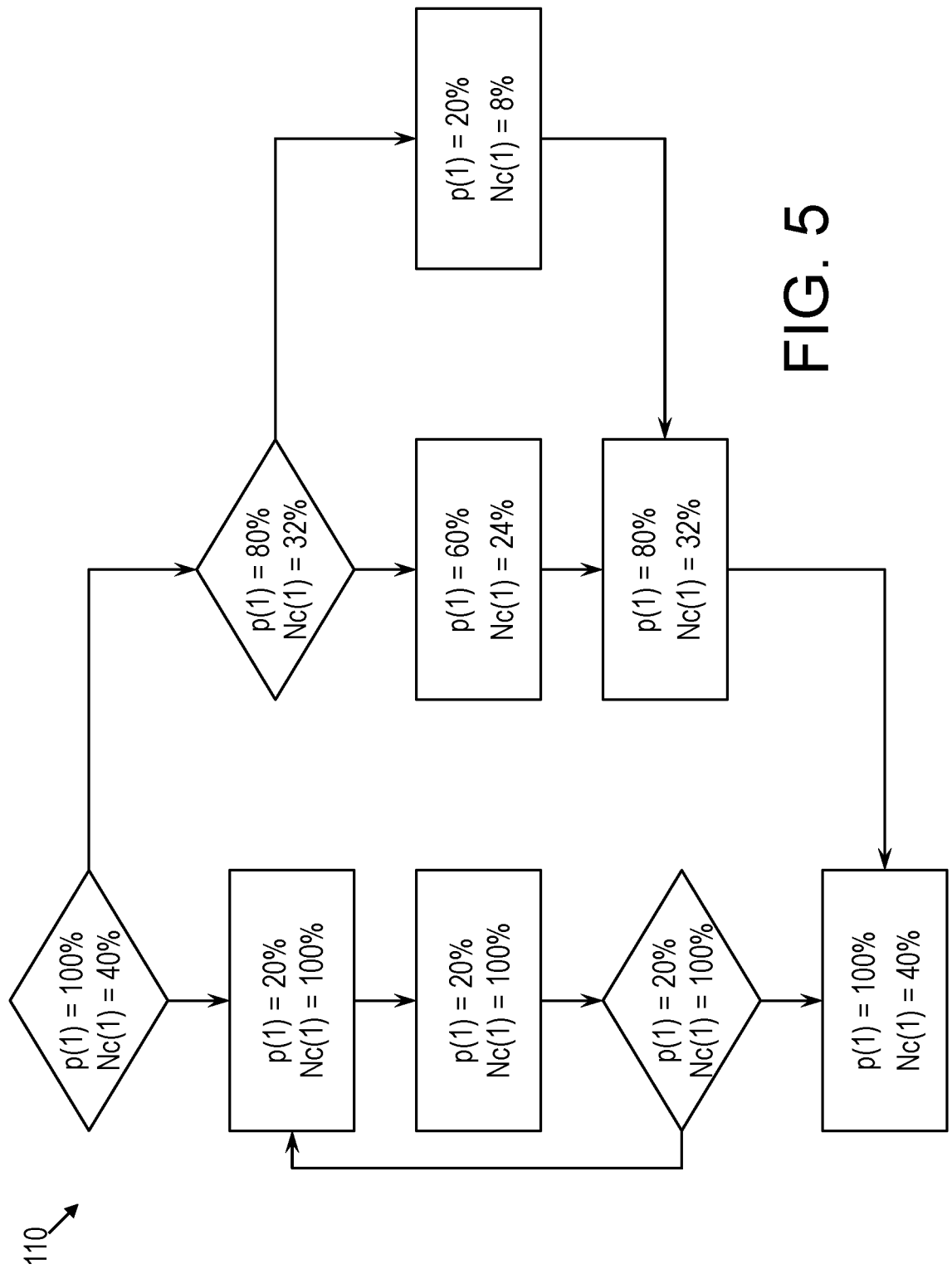
FIG. 5 is an example initial CFG, prior to simplification, according to some embodiments of the invention.

FIG. 5 illustrates an example initial CFG 110, according to some embodiments of the invention. This example initial CFG 110 has nine graph nodes 210, numbered Node 1 through Node 9, representing nine program nodes. In FIG. 5A, each graph node 210 is annotated with its execution probability and normalized execution count. For simplicity, in this example, $\alpha=\beta=1$, so the weight of each graph node 210 is the sum of the execution probability and the normalized execution count.

FIGS. 6A-6B illustrate an example of executing the above method 400 of selecting, or marking, main nodes 610 and main edges 620 in the initial CFG 110 of FIG. 5, according to some embodiments of the invention.

In one version of this example execution of the method 400 of marking main nodes 610 and main edges 620, the user provides a minimum count of four graph nodes 210 for the final CFG 130. In the first iteration of the loop, Node 1 is marked as a main node 610, specifically a primitive main node. However, because Node 1 has no former nodes, no derived main nodes 610 are marked in the first iteration. In the second iteration, Node 9 is marked as a main node 610, specifically a primitive main node 610, due to having the highest weight. In order, Node 7, Node 4, and Node 2 are marked as derived main nodes 610, with Node 7 being a former node of Node 9, Node 4 being a former node of Node 7, and Node 2 being a former node of Node 4. Where Edge(x, y) refers to the edge 220 beginning at Node X and ending at Node Y, the following edges 220 are then marked as main edges 620, due to connecting pairs of main nodes 610: Edge(1, 2), Edge(2, 4), Edge(4, 7), Edge(7, 9) and Edge(7, 2). FIG. 6A illustrates the initial CFG 110, including these markings. Specifically, all graph nodes 210 that are not main nodes 610 and all edges 220 that are not main edges 620 are shown with dashed outlines. The primitive main nodes 610 are shown with thicker solid outlines, as compared to the thinner solid outlines of the derived main nodes 610. The main edges 620 are shown with solid lines. The resulting final CFG 130 is shown in FIG. 6B.

In another version of this example execution of the method 400 of marking main nodes 610 and main edges 620, the user provides a probability threshold of 100%. Thus, Node 1 and Node 9 are marked as main nodes 610, specifically primitive main nodes 610. The first iteration of the loop examines former nodes of Node 1, of which there are none. Thus, in this iteration, no primitive or derived main nodes 610 are marked, and no main edges 620 are marked. In the second iteration, in order, Node 7, Node 4, and Node 2 are selected as derived main nodes 610, with Node 7 being a former node of Node 9, Node 4 being a former node of Node 7, and Node 2 being a former node of Node 4. The following edges 220 are then marked as main edges 620, due to connecting pairs of main nodes 610: Edge(1, 2), Edge(2, 4), Edge(4, 7), Edge(7, 9) and Edge(7, 2).

In this case, the result is the same in both versions of the example, but it need not be the case that using a minimum count yields the same result as using a probability threshold. However, once again, FIG. 6A illustrates the initial CFG 110, including the markings described above. The resulting final CFG 130 is shown in FIG. 6B.

As discussed above with respect to FIG. 3, after selection of the main nodes 610 and main edges 620, these main nodes 610 and main edges 620 may be isolated from the remaining graph nodes 210 and edges 220 to produce the final CFG 130. In other words, in some embodiments of the invention, the final CFG 130 includes the main nodes 610, both primitive and derived, and the main edges 620 but exclude other graph nodes 210 and edges 220.

FIG. 7 is a block diagram of a computer system 700 for implementing some or all aspects of the system, according to some embodiments of this invention. The simplification systems 100 and methods described herein may be implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor-based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid-state drive. The stored instructions in memory 710 or in storage 720 may include those enabling the processor to execute one or more aspects of the simplification systems 100 and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Simplification systems 100 and methods according to this disclosure may be embodied, in whole or in part, in computer program products or in computer systems 700, such as that illustrated in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
    receiving an initial control flow graph (CFG) describing a project, wherein the project comprises one or more programs, and wherein the initial CFG comprises a plurality of graph nodes and a plurality of edges connecting the plurality of graph nodes to one another;
    building a first profiling data and a second profiling data respectively based on tracking execution of the project by a first user and a second user, the first profiling data describing an execution path of the project by the first user, and the second profiling data describing a distinct execution path by the second user;
    determining whether a first final CFG requires a minimum count of graph nodes;
    selecting, as a first set of main nodes, a first set of one or more graph nodes of the plurality of graph nodes of the initial CFG, based on the first profiling data, wherein a selection method is respective to the first user and based on whether the first final CFG requires a minimum count of graph nodes;
    selecting, as a set of main edges, one or more edges of the plurality of edges, based on the one or more edges connecting the first set of main nodes; and
    simplifying the initial CFG by generating the first final CFG that comprises the first set of main nodes and excludes one or more remaining nodes of the initial CFG that are not in the first set of main nodes.

2. The computer-implemented method of claim 1, wherein the selecting, as the first set of main nodes, the first set of one or more graph nodes is based at least in part on a probability of execution of each graph node of the plurality of graph nodes.

3. The computer-implemented method of claim 2, wherein at least one main node of the first set of main nodes is included in the first set of main nodes based on having a probability of execution that meets a probability threshold.

4. The computer-implemented method of claim 1, wherein the selecting, as the first set of main nodes, the first set of one or more graph nodes is based at least in part on an importance weight of each node of the plurality of graph nodes.

5. The computer-implemented method of claim 1, further comprising:
    selecting, as a second set of main nodes, a second set of one or more graph nodes of the plurality of graph nodes of the initial CFG, based on second profiling data, wherein the second profiling data describes a second execution history of the project, and wherein the second execution history differs from the first execution history; and
    simplifying the initial CFG by generating a second final CFG that comprises the second set of main nodes and excludes one or more other nodes of the initial CFG that are not in the second set of main nodes.

6. The computer-implemented method of claim 1, further comprising generating the first profiling data by monitoring a plurality of executions of the project.

7. A system comprising:
    a memory having computer-readable instructions; and one or more processors for executing the computer-readable instructions, the computer-readable instructions comprising:

receiving an initial control flow graph (CFG) describing a project, wherein the project comprises one or more programs, and wherein the initial CFG comprises a plurality of graph nodes and a plurality of edges connecting the plurality of graph nodes to one another;

building a first profiling data and a second profiling data respectively based on tracking execution of the project by a first user and a second user, the first profiling data describing an execution path of the project by the first user, and the second profiling data describing a distinct execution path by the second user;

determining whether a first final CFG requires a minimum count of graph nodes;

selecting, as a first set of main nodes, a first set of one or more graph nodes of the plurality of graph nodes of the initial CFG, based on the first profiling data, wherein a selection method is respective to the first user and based on whether the first final CFG requires a minimum count of graph nodes;

selecting, as a set of main edges, one or more edges of the plurality of edges, based on the one or more edges connecting the first set of main nodes; and simplifying the initial CFG by generating the first final CFG that comprises the first set of main nodes and excludes one or more remaining nodes of the initial CFG that are not in the first set of main nodes.

8. The system of claim 7, wherein the selecting, as the first set of main nodes, the first set of one or more graph nodes is based at least in part on a probability of execution of each graph node of the plurality of graph nodes.

9. The system of claim 8, wherein at least one main node of the first set of main nodes is included in the first set of main nodes based on having a probability of execution that meets a probability threshold.

10. The system of claim 7, wherein the selecting, as the first set of main nodes, the first set of one or more graph nodes is based at least in part on an importance weight of each node of the plurality of graph nodes.

11. The system of claim 7, the computer-readable instructions further comprising:

selecting, as a second set of main nodes, a second set of one or more graph nodes of the plurality of graph nodes of the initial CFG, based on second profiling data, wherein the second profiling data describes a second execution history of the project, and wherein the second execution history differs from the first execution history; and simplifying the initial CFG by generating a second final CFG that comprises the second set of main nodes and excludes one or more other nodes of the initial CFG that are not in the second set of main nodes.

12. The system of claim 7, the computer-readable instructions further comprising generating the first profiling data by monitoring a plurality of executions of the project.

13. A computer-program product for simplifying a control flow graph (CFG), the computer-program product comprising a computer-readable storage medium having program instructions embodied therewith, the program instructions executable by a processor to cause the processor to perform a method comprising:

receiving an initial CFG describing a project, wherein the project comprises one or more programs, and wherein the initial CFG comprises a plurality of graph nodes and a plurality of edges connecting the plurality of graph nodes to one another;

building a first profiling data and a second profiling data respectively based on tracking execution of the project by a first user and a second user, the first profiling data describing an execution path of the project by the first user, and the second profiling data describing a distinct execution path by the second user;

determining whether a first final CFG requires a minimum count of graph nodes;

selecting, as a first set of main nodes, a first set of one or more graph nodes of the plurality of graph nodes of the initial CFG, based on the first profiling data, wherein a selection method is respective to the first user and based on whether the first final CFG requires a minimum count of graph nodes;

selecting, as a set of main edges, one or more edges of the plurality of edges, based on the one or more edges connecting the first set of main nodes; and simplifying the initial CFG by generating the first final CFG that comprises the first set of main nodes and excludes one or more remaining nodes of the initial CFG that are not in the first set of main nodes.

14. The computer-program product of claim 13, wherein the selecting, as the first set of main nodes, the first set of one or more graph nodes is based at least in part on a probability of execution of each graph node of the plurality of graph nodes.

15. The computer-program product of claim 14, wherein at least one main node of the first set of main nodes is included in the first set of main nodes based on having a probability of execution that meets a probability threshold.

16. The computer-program product of claim 13, wherein the selecting, as the first set of main nodes, the first set of one or more graph nodes is based at least in part on an importance weight of each node of the plurality of graph nodes.

17. The computer-program product of claim 13, the method further comprising:

selecting, as a second set of main nodes, a second set of one or more graph nodes of the plurality of graph nodes of the initial CFG, based on second profiling data, wherein the second profiling data describes a second execution history of the project, and wherein the second execution history differs from the first execution history; and simplifying the initial CFG by generating a second final CFG that comprises the second set of main nodes and excludes one or more other nodes of the initial CFG that are not in the second set of main nodes.

18. The computer-implemented method of claim 2, wherein basing the selection of the first set of main nodes on at least in part on a probability of execution of each graph node of the plurality of graph nodes is in response to determining the first final CFG does not require a minimum count of graph nodes.

19. The system of claim 8, wherein basing the selection of the first set of main nodes on at least in part on a probability of execution of each graph node of the plurality of graph nodes is in response to determining the first final CFG does not require a minimum count of graph nodes.

20. The computer-program product of claim 14, wherein basing the selection of the first set of main nodes on at least in part on a probability of execution of each graph node of the plurality of graph nodes is in response to determining the first final CFG does not require a minimum count of graph nodes.

* * * * *